US009135225B2

(12) United States Patent  
Brinkman et al.

(10) Patent No.: US 9,135,225 B2  
(45) Date of Patent: Sep. 15, 2015

(54) DATA DESCRIPTION INJECTION

(75) Inventors: John P. Brinkman, Ontario (CA); Jean A. Young, Co. Louth (IE)

(73) Assignee: Adobe Systems Incorporated, San Jose, CA (US)

( * ) Notice: Subject to any disclaimer, the term of this patent is extended or adjusted under 35 U.S.C. 154(b) by 1001 days.

(21) Appl. No.: 12/572,969

(22) Filed: Oct. 2, 2009

(65) Prior Publication Data

US 2014/0032609 A1    Jan. 30, 2014

(51) Int. Cl.
  *G06F 17/30*    (2006.01)
  *G06F 17/22*    (2006.01)
  *G06F 17/24*    (2006.01)

(52) U.S. Cl.
  CPC .......... *G06F 17/2247* (2013.01); *G06F 17/243* (2013.01); *G06F 17/30911* (2013.01)

(58) Field of Classification Search
  USPC ......................................................... 707/803
  See application file for complete search history.

(56) References Cited

U.S. PATENT DOCUMENTS

| | | | |
|---|---|---|---|
| 6,651,217 B1* | 11/2003 | Kennedy et al. | 715/224 |
| 6,681,247 B1* | 1/2004 | Payton | 709/217 |
| 7,047,318 B1* | 5/2006 | Svedloff | 709/246 |
| 7,281,018 B1* | 10/2007 | Begun et al. | 1/1 |
| 7,664,776 B1* | 2/2010 | Cameron | 707/803 |
| 7,904,806 B2* | 3/2011 | Muschett | 715/236 |
| 8,060,818 B2* | 11/2011 | Wang et al. | 715/221 |
| 2002/0065830 A1* | 5/2002 | de Hilster et al. | 707/102 |
| 2005/0050105 A1* | 3/2005 | Idicula et al. | 707/200 |
| 2005/0066287 A1* | 3/2005 | Tattrie et al. | 715/769 |
| 2005/0080756 A1* | 4/2005 | Hitchcock et al. | 707/1 |
| 2006/0031404 A1* | 2/2006 | Kassab | 709/218 |
| 2006/0074981 A1* | 4/2006 | Mauceri et al. | 707/104.1 |
| 2006/0242178 A1* | 10/2006 | Butterfield et al. | 707/100 |
| 2007/0078846 A1* | 4/2007 | Gulli et al. | 707/5 |

* cited by examiner

*Primary Examiner* — James Trujillo  
*Assistant Examiner* — Kurt Mueller  
(74) *Attorney, Agent, or Firm* — Shook, Hardy & Bacon, L.L.P.

(57) ABSTRACT

A system and method for injecting a node into a data description of an electronic form are provided. In one embodiment, the system comprises a request detector, an injection tool, a template module, and a storing module. The request detector may be configured to detect a request to include a new form object into an electronic form. The injection tool may be configured to determine that the data schema does not accommodate the new form object, and to automatically modify the data description by adding a node that is associated with the new form object. The template module may be configured to add the new form object into the electronic form to create a modified electronic form. The modified electronic form comprises the modified data description, while the data schema upon which the electronic form was originally based may remain unchanged.

20 Claims, 5 Drawing Sheets

DATA DESCRIPTION INJECTION

TECHNICAL FIELD

This disclosure relates generally to the technical fields of software and/or hardware technology and, in one example embodiment, to a system and method for injecting a node into a data description of an electronic form.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The eXtensible Markup Language (XML) Forms Architecture (XFA) provides a template-based grammar and a set of processing rules that may allow the implementing of interactive electronic forms. Form designers can choose to base an electronic form (referred to as merely "form") on a predefined data schema (e.g., the World Wide Web Consortium (W3C) XML Schema) that describes the structure of an XML document in order to make sure that data saved by the form conforms to a particular data model. A data schema is effectively a contract shared by all generators and consumers of that data. If it is determined that a form should include an additional form object (e.g., a new data entry field), the data schema can be changed to accommodate the inclusion of a new form object.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description, numerous specific details are set forth to provide a thorough understanding of claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, and as is apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Data collected by means of an electronic form can be constrained by a formal data schema. When an electronic form is based on a data schema, such as an XML schema, a compiled version of that data schema is stored in an XFA form. The XFA form also includes a form template that comprises one or more form objects (e.g., form fields). The compiled version of the data schema may be referred to as a data description. The data description, which comprises a plurality of data nodes, is used at runtime by a processing application to verify that data generated by and exported from the form conforms to the underlying data schema. Electronic forms may be created utilizing a forms editor that may include a graphical user interface provided by a form view module. The form view module may provide a hierarchical tree view of the form template and its objects in a hierarchy window and a hierarchical tree view of the data description or schema in a data view window. The data view window may be used to bind data nodes and form objects. A hierarchical tree view of the data description may be presented to a user who is the form designer to permit the user to associate individual form objects included in the form template to particular data nodes in the associated data description.

An example XML Data Package (XDP) file showing a form template with two fields and a data description describing expected data for the form as prescribed by the associated data schema is shown below in Table 1.

TABLE 1

```
<xdp:xdp xmlns:xdp="http://ns.adobe.com/xdp/">
  <template xmlns="http://www.xfa.org/schema/xfa-template/2.6/">
    <subform name="purchaseOrder">
      <subform>
        <subform>
          <bind ref="$.general"/>
          <field>
            <bind ref="$.poNum"/>
          </field>
          <field>
            <bind ref="$.poDate"/>
          </field>
        </subform>
      </subform>
    </subform>
  </template>
  <xfa:datasets xmlns:xfa="http://www.xfa.org/schema/xfa-data/1.0/">
    <dd:dataDescription xmlns:dd="http://ns.adobe.com/data-description/">
      <purchaseOrder>
        <general>
          <poNum/>
          <poDate/>
        </general>
      </purchaseOrder>
    </dd:dataDescription>
  </xfa:datasets>
</xdp:xdp>
```

In one example embodiment, a system and method are provided for injecting a new node into a data description of an electronic form to permit adding a new form object into a form template without requiring a change to the underlying data schema. Data description injection thus allows form designers to extend a data schema of an electronic form beyond the original base data schema by adding one or more form objects into the form template and automatically generating associated data nodes in the data description, such that the resulting form includes the new form objects that are bound to the respective new nodes in the data description. In one embodiment, a forms editor may be configured to include an injection tool that detects a reference to a new form object and automatically injects an associated data node into the data description portion of the form.

For example, a data schema that describes sibling data nodes A, B and C may be used to create an electronic form that has three form objects that are bound to the data nodes A, B and C. The data schema may be an external data schema in that it is being used for generating more than one electronic form and possibly used by more than one entity or business organization. For example, W3C XML Schemas in particular are frequently defined by industry or government to describe data which is shared by multiple companies in that industry or by multiple government departments. The data schema may also be made an internal data schema, as a distinct component of the form (XDP). It may be desirable that one of the forms that are based on the data schema also includes a fourth form object (e.g., an additional data field) that is not described by a node in the data schema. If the forms editor includes an injection tool, the injection tool recognizes when a reference to a new form object is added to the form template (e.g., via the graphical user interface associated with the forms editor) and automatically generates an additional data node D in the data description, such that the data node D corresponds to the new form object. At runtime, the existence of the new data node in the data description means that data in the new form field bound to the data node D will be saved with other application data associated with the form.

In some embodiments, a graphical user interface associated with the forms editor may include a form view feature that provides a visual representation of the hierarchical structure of the data description, which is automatically updated when a new node is injected into the data description. In one embodiment, additional data nodes injected into the data description can optionally use a separate XML namespace defined by the designer of the form. This allows the injected data to be easily identified in the output data.

In some embodiments, data description injection may also be performed hierarchically or recursively. While described above are examples of injection of a single leaf node, a user may also be permitted to insert a new form subform (or container), where the associated binding references a non-existent container data node. Data description injection therefore creates a new container data node. The user can then create a new field form object inside that subform with a data binding that results in a second data node injection inside the first injected data node.

There is also no requirement that the template or form objects hierarchy and the data description/schema hierarchy should match. By default the hierarchical position of a data node corresponding to a form object is determined by matching to the corresponding hierarchical position, but the binding for a form object can explicitly reference a data node at any position in the data schema hierarchy. And if this explicit reference targets a node in the data tree that does not exist, it will result in injection of one (or more) data nodes (e.g., a single form object may specify a binding to data node X which is a child of data node Y where neither node X nor node Y exist. Both node X and node Y are automatically injected in this case.

Figure 1:
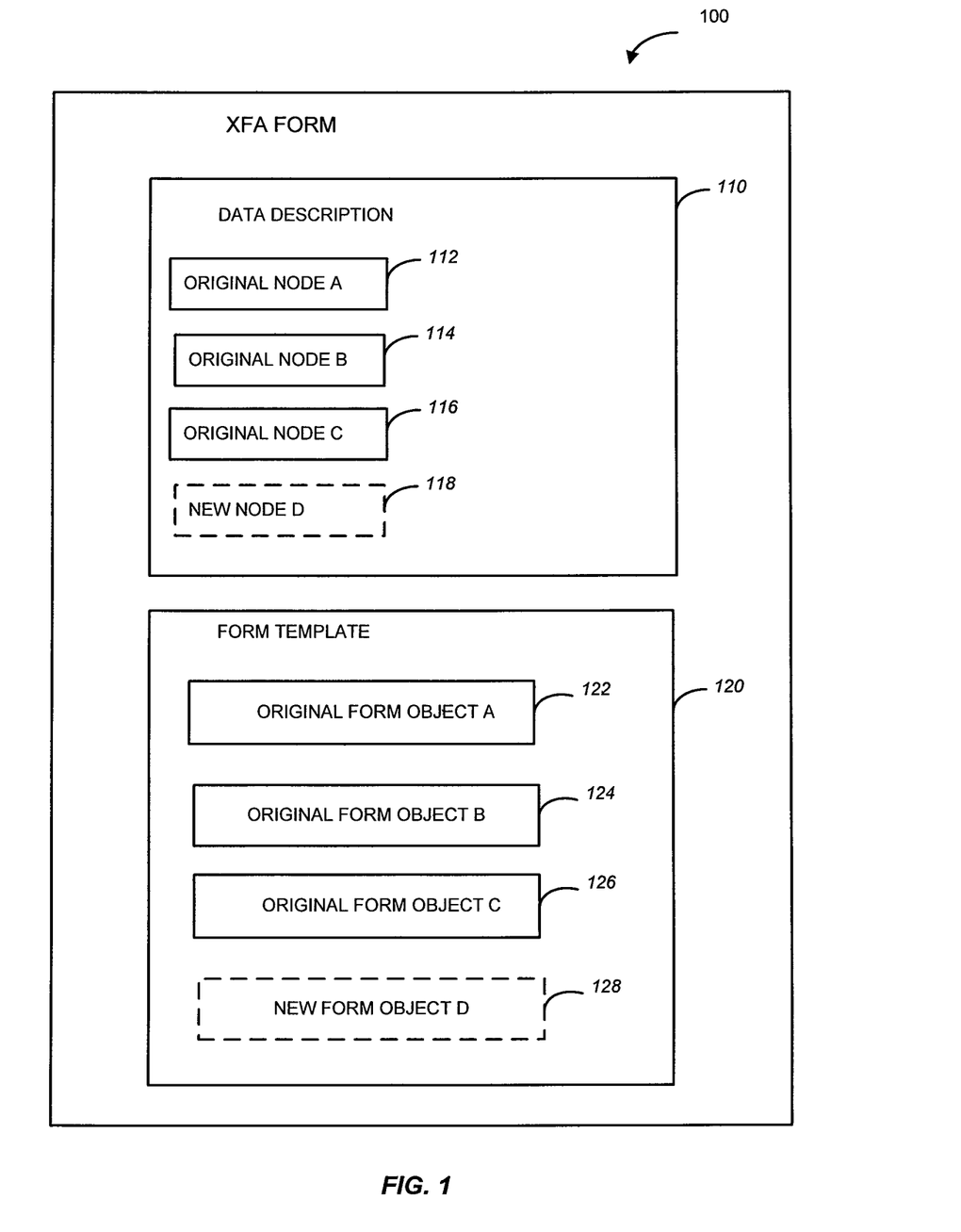
FIG. 1 is a block diagram showing an example electronic form, in accordance with an example embodiment.

An example XFA form 100 is illustrated in FIG. 1. The XFA form 100 includes a data description 110 comprising data nodes 112-118 and a form template 120 comprising form objects 122-128. The form object 122 is bound to the data node 112. The form object 124 is bound to the data node 114. The form object 126 is bound to the data node 116. The form object 128 is bound to the data node 118. The form objects 122-126 are shown as associated with the data nodes 112-116 provided via an external data schema, while the data node 118 is shown as automatically injected into the data description by an injection tool in response to detecting a reference to the newly added form object 128.

An example method and system for injecting a node into a data description of an electronic form may be described with reference to a network environment 200 illustrated in FIG. 2. The network environment 200 may include one or more computer systems, such as a client computer system 210, a content management server 220, and an application server 240. The client computer system 210, the content management server 220, and the application server 240 may be in communication with each other via a communications network 230. The client computer system, for example, may utilize a browser application 212 to access an electronic form provided by a processing application 242 hosted by the application server 240. The communications network 230 may be a public network (e.g., the Internet, a wireless network, a public switched telephone network (PSTN), etc.) or a private network (e.g., LAN, WAN, intranet, etc.).

Figure 2:
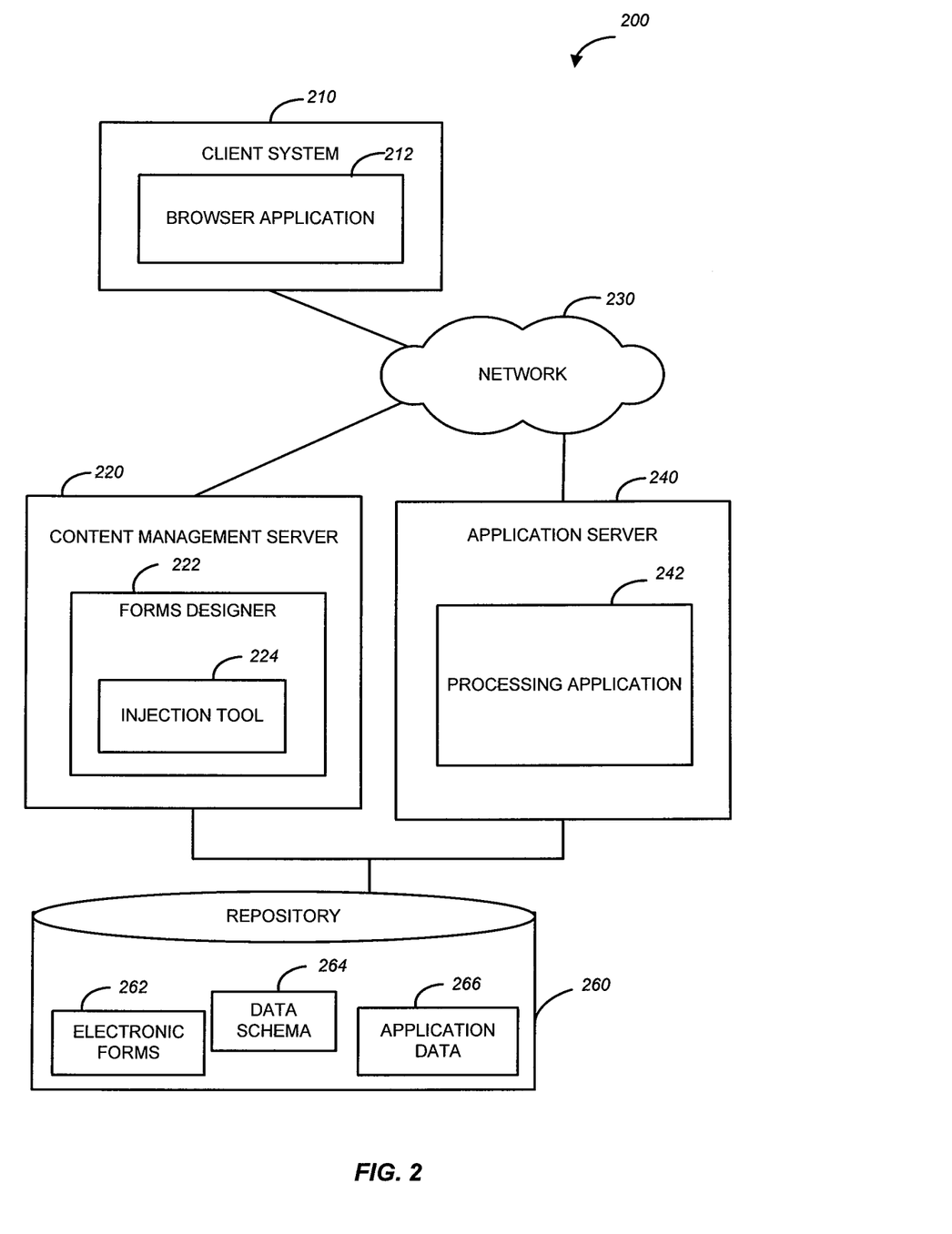
FIG. 2 is a block diagram showing a network environment within which a method and system for injecting a node into a data description of an electronic form may be implemented, in accordance with an example embodiment.

As shown in FIG. 2, the content management server 220 hosts a forms designer 222. The forms designer 222 (which may also be referred to as a forms editor) may be configured to create and manipulate electronic forms. An injection tool 224 provided with the forms designer 222 may be configured to automatically modify the data description of an electronic form by adding a node that is associated with a new requested form object, thus creating a modified data description.

Also shown in FIG. 2 is the application server 240 that hosts a processing application 242 that may be configured to access an electronic form created by the forms designer, provide the electronic form to a browser application, and receive form data (e.g., data collected from a user via the electronic form displayed by the browser running in the client). The collected data may be stored in a repository 260 as application data 266. The repository 260 may be accessible to the application server 240 and the content management server 220 and may also store electronic forms 262 that comprise respective form templates and the associated data descriptions, as well as the data schema 264. An example system for automatically injecting one or more nodes into a data description of an electronic form, without requiring a change to the underlying data schema, may be discussed with reference to FIG. 3.

Figure 3:
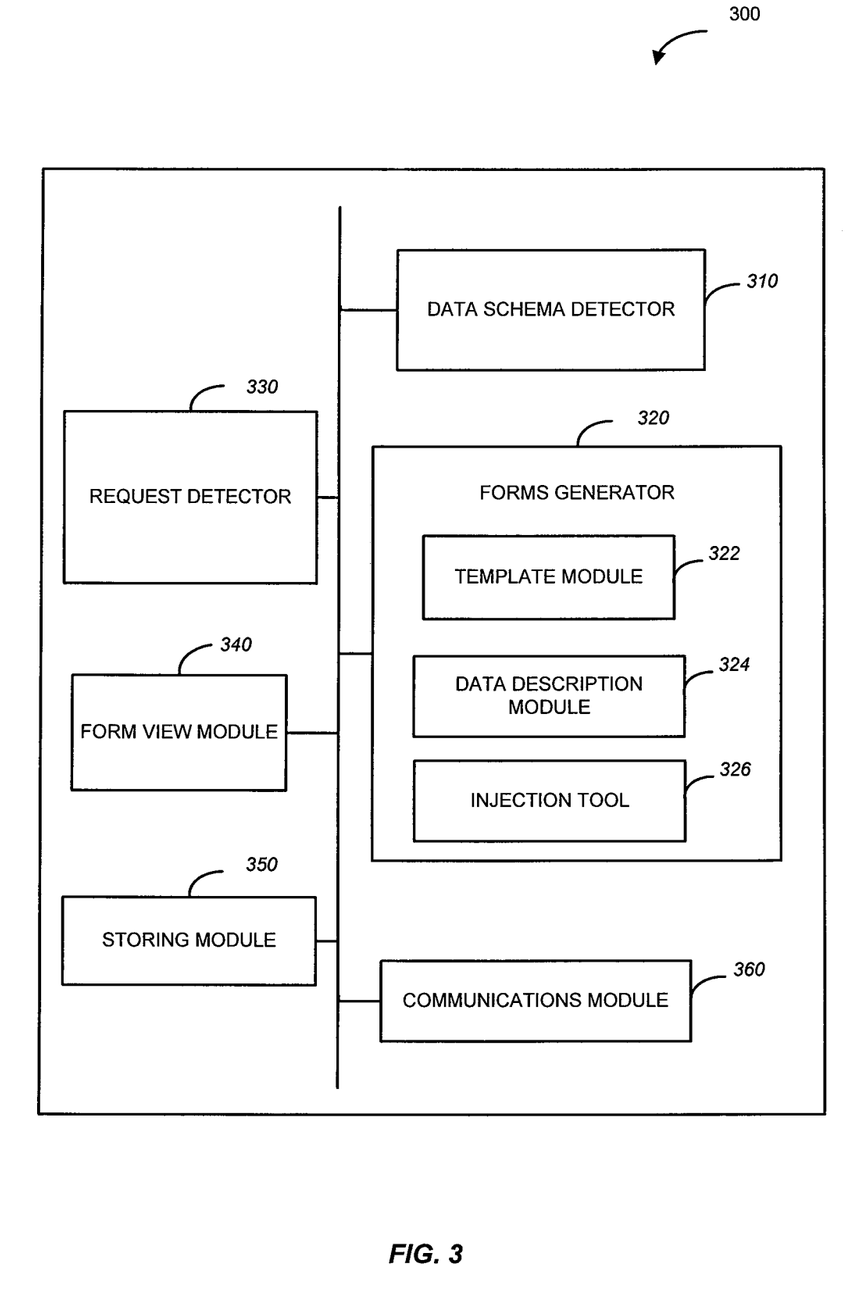
FIG. 3 is a block diagram illustrating a system for injecting a node into a data description of an electronic form, in accordance with an example embodiment.

FIG. 3 shows a block diagram illustrating a system 300 for injecting a node into a data description of an electronic form, according to one example embodiment. As shown in FIG. 3, the system 300 includes a data schema detector 310 and a forms generator 320. In order to create an electronic form, the data schema detector 310 may be used to access a data schema to be used as an underlying data schema for the form. The forms generator 320 may engage a template module 322 to generate a form template and a data description module 324. As described above, a data description may be created by compiling the data schema accessed by the schema detector 310. The template module 322 and the data description module 324 may be provided as part of the forms generator 320.

The system 300 also includes a request detector 330 that may be configured to detect a request to include a new form object into an electronic form. As described above, while the data description may be initially generated by compiling the underlying data schema, the data description may be automatically updated in response to a request to include a new form object into the form template. Such ad-hoc extension of the data schema of an electronic form may be effectuated by engaging an injection tool 326 to automatically modify the data description by adding a data node associated with the new form object. As shown in FIG. 3, the injection tool 326 may be provided as part of the forms generator 320. A form view module 340 may be configured to provide a hierarchical tree view of the form template and its objects in a hierarchy window and a hierarchical tree view of the data description or schema in a data view window.

Also shown in FIG. 3 is a storing module 350 and a communications module 360. The storing module 350 may be configured to store an in-memory representation of an electronic form in a memory device. The communications module 360 may be configured to provide an electronic form to a processing application. Various operations performed by the system 300, according to an example embodiment, may be discussed with reference to FIG. 4.

Figure 4:
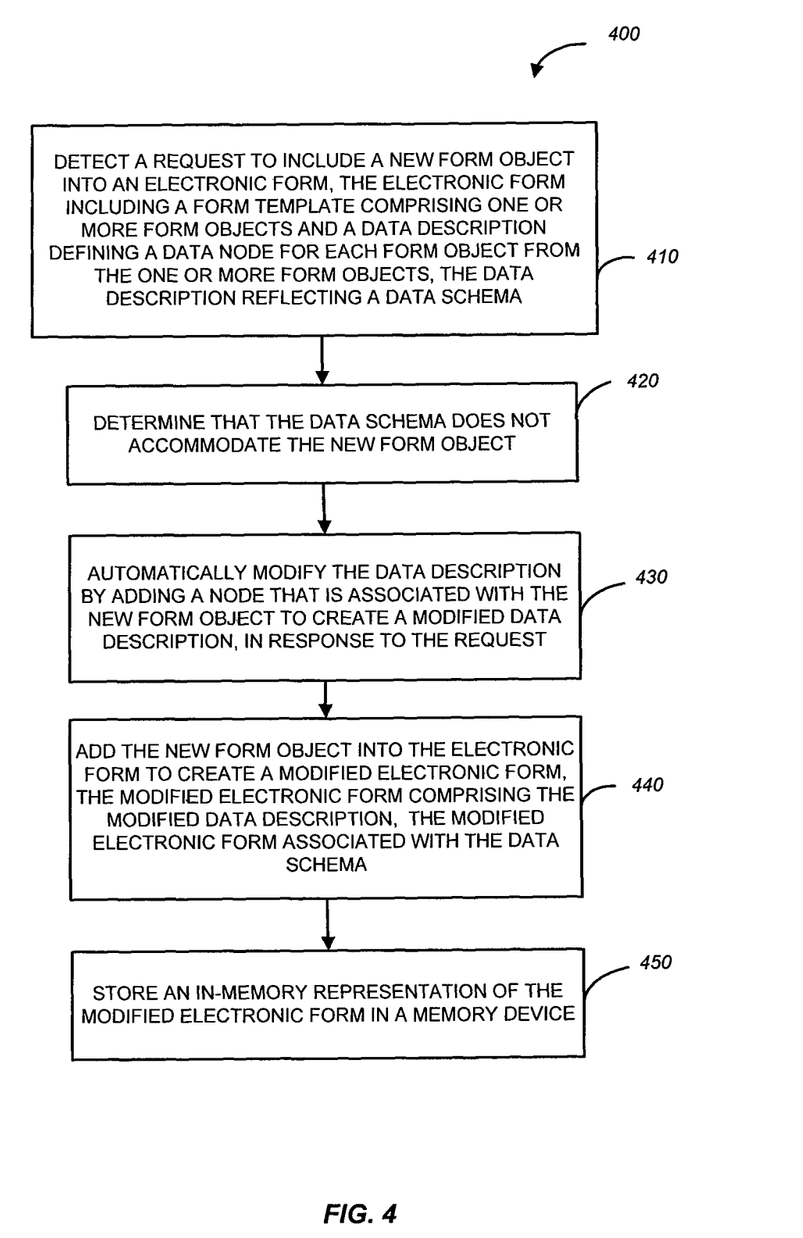
FIG. 4 is a flow chart illustrating a method for injecting a node into a data description of an electronic form, in accordance with an example embodiment.

FIG. 4 is a flow chart illustrating a method 400 for injecting a node into a data description of an electronic form, in accordance with an example embodiment. The method 400 may be performed by processing logic that may comprise hardware (e.g., dedicated logic, programmable logic, microcode, etc.), software (such as is run on a general purpose computer system programmed to perform particular functions pursuant to instructions from program software or on a dedicated machine), or a combination of both. The processing logic, according to example embodiments, may reside in any of the modules shown in FIG. 3. The modules illustrated in FIG. 3 may be implemented as software, hardware, or a combination of both.

As shown in FIG. 4, the method 400 commences with operation 410, where the request detector 330 of FIG. 3 detects a request to include a new form object into an electronic form. At operation 420, the injection tool 326 of FIG. 3 determines that the data schema does not accommodate the new form object, and automatically modifies the data description by adding a node that is associated with the new form object, at operation 430. At operation 440, a template module 322 adds the new form object into the electronic form to create a modified electronic form. The modified electronic form comprises the modified data description, while the data schema upon which the electronic form was originally based may remain unchanged. At operation 450, the storing module 350 stores an in-memory representation of the modified electronic form in a memory device, such as in the repository 260 of FIG. 2.

Figure 5:
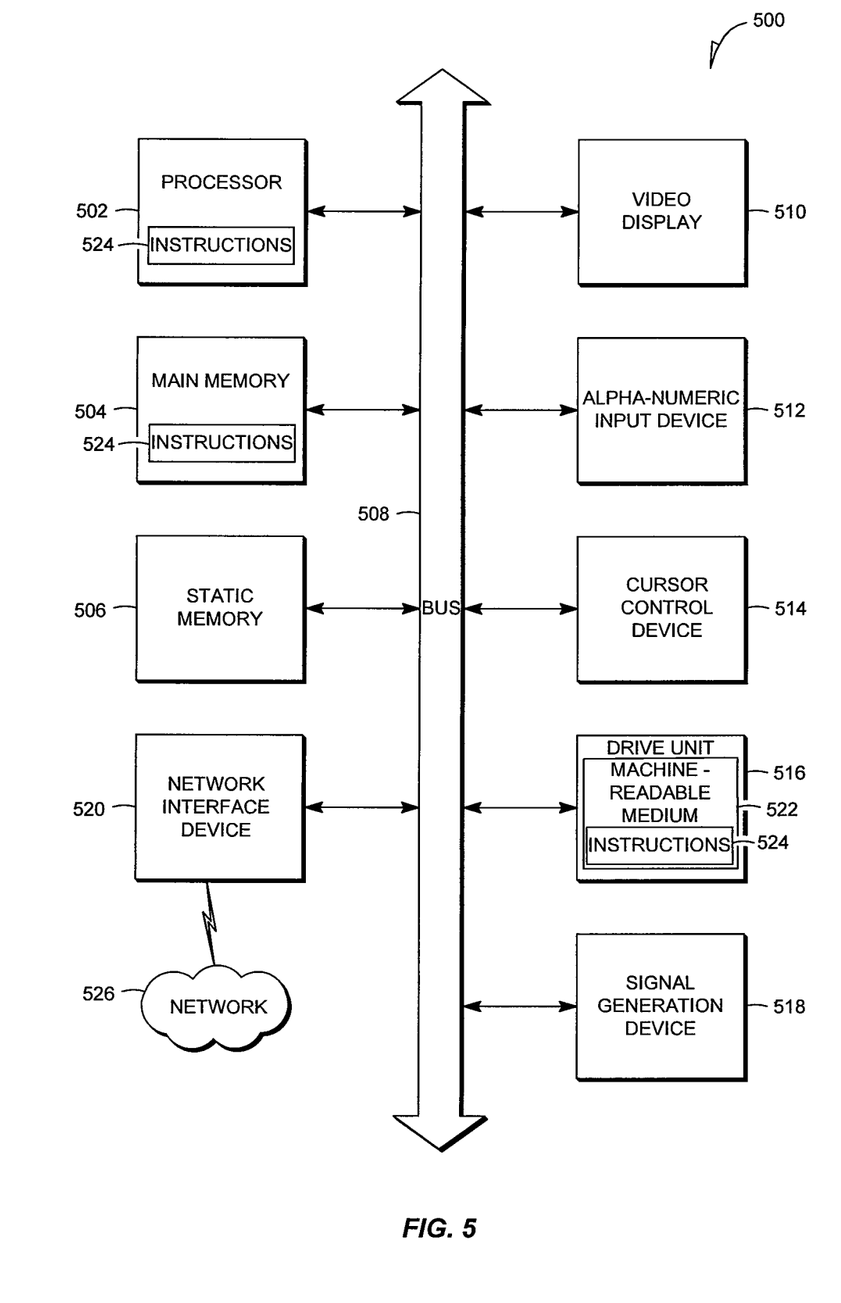
FIG. 5 is a diagrammatic representation of a machine in the example form of a computer system within which a set of instructions, for causing the machine to perform any one or more of the methodologies discussed herein, may be executed.

FIG. 5 is a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) cursor control device 514 (e.g., a mouse), a disk drive unit 516, a signal generation device 518 (e.g., a speaker) and a network interface device 520.

The disk drive unit 516 includes a computer-readable (or machine-readable) medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAM), read only memory (ROM), and the like.

Thus, method and system for injecting a node into a data description of an electronic form have been described. Data description injection, in one example embodiment, may permit ad-hoc extensions to the data schema in a way that allows other XFA processing applications to manage the extended data as if it were defined by the original data schema and allows easy identification of the injected data via the resultant XML data or via the data description within the form. While some example approaches described herein may be used with ADOBE® products, the techniques described herein may be utilized beneficially with various programs or a suite of products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
    detecting a request to include a new form object into an electronic form, the electronic form including a data description and a form template, the data description describing expected data as prescribed by a data schema by containing a set of data nodes in accordance with a data model defined by the data schema, the form template comprising one or more form objects, each form object being associated with a data node from the set of data nodes to conform with the data model defined by the data schema;
    determining that the new form object does not conform to the data model defined by the data schema;
    automatically modifying the data description in response to the request, the modifying including adding a new data node corresponding to the new form object to the data description to create a modified data description, the modified data description containing the set of data nodes in accordance with the data model defined by the data schema and the new data node not in accordance with the data model defined by the data schema;
    adding the new form object corresponding to the new data node into the form template of the electronic form to create a modified electronic form, the modified electronic form comprising the modified data description; and
    storing an in-memory representation of the modified electronic form in a memory device.

2. The method of claim 1, comprising providing the modified electronic form to a processing application.

3. The method of claim 1, wherein the node that is associated with the new form object is specified in a separate eXtensible Markup Language (XML) namespace, such that the new data node may be identified.

4. The method of claim 1, wherein the data schema is an external data schema.

5. The method of claim 1, wherein the data schema is an eXtensible Markup Language (XML) data schema.

6. The method of claim 1, comprising updating a visual representation of the data description to reflect the added node that is associated with the new form object.

7. The method of claim 6, wherein the visual representation of the data description represents a hierarchical tree structure.

8. The method of claim 1, wherein the new form object is a new subform.

9. The method of claim 1, wherein the modifying of the data description comprises identifying a position in the data schema hierarchy for the node.

10. The method of claim 1, wherein the request to include the new form object into an electronic form specifies explicitly a position in the data schema hierarchy for the node that is associated with the new form object.

11. The method of claim 10, wherein the modifying of the data description comprises:
    identifying the node as a child of a non-existent node in the data description; and
    adding a parent node for the new node in the data description.

12. A computer-implemented system comprising:
    a request detector to detect a request to include a new form object into an electronic form, the electronic form including a data description and a form template the data description describing expected data as prescribed by a data schema by containing a set of data nodes in accordance with a data model defined by the data schema, the form template comprising one or more form objects, each form object being associated with a data node from the set of data nodes to conform with the data model defined by the data schema;
    an injection tool to:
    determine that the data model defined by the data schema does not accommodate the new form object, and
    automatically modify the data description in response to the request, the modifying including adding a new data node corresponding to the new form object to the data description to create a modified data description, the modified data description containing the set of data nodes in accordance with the data model defined by the data schema and the new data node not in accordance with the data model defined by the data schema;
    a template module to add the new form object corresponding to the new data node into the form template of the electronic form to create a modified electronic form, the modified electronic form comprising the modified data description; and
    a storing module to store an in-memory representation of the modified electronic form in a memory device.

13. The system of claim 12, comprising a communications module to provide the modified electronic form to a processing application.

14. The system of claim 12, wherein the data schema is an eXtensible Markup Language (XML) data schema and wherein the new data node uses a separate XML namespace to identify the new data node.

15. The system of claim 12, comprising a form view module to:
   update a visual representation of the data description to reflect the added node that is associated with the new form object.

16. The system of claim 15, wherein the visual representation of the data description represents a hierarchical tree structure.

17. The system of claim 12, wherein the new form object is a new subform.

18. The system of claim 12, wherein the injection tool is to identify a position in the data schema hierarchy for the node.

19. The system of claim 12, wherein the request to include the new form object into an electronic form specifies explicitly a position in the data schema hierarchy for the node that is associated with the new form object.

20. A machine-readable medium having instruction data to cause a machine to:
   generate a visual representation of an electronic form, the electronic form including a data description and a form template, the data description describing expected data as prescribed by an external data schema by containing a set of data nodes in accordance with a particular data model defined by the external data schema, the form template comprising one or more form objects, each form object being associated with a data node from the set of data nodes to conform with the particular data model defined by the external data schema;
   detect a request to include a new form object into the electronic form, the new form object not conforming to the particular data model defined by the external data schema;
   in response to the request, modify the data description by adding a new data node that is associated with the new form object to the data description to create a modified data description, the modified data description containing the set of data nodes in accordance with the particular data model defined by the external data schema and the new data node not in accordance with the particular data model defined by the external data schema;
   add the new form object associated with the new data node into the electronic form to create a modified electronic form, the modified electronic form comprising the modified data description; and
   update the visual representation of the electronic form to reflect modified electronic form including the new form object.

* * * * *